United States Patent [19]

Shisgal et al.

[11] Patent Number: 4,844,189
[45] Date of Patent: Jul. 4, 1989

[54] PLATFORM TYPE WEIGHING SCALE

[75] Inventors: Ben Zion Shisgal; Ehud Ermoza, both of Carmiel, Israel

[73] Assignee: Keter Plastic, Ltd., Jaffa, Israel

[21] Appl. No.: 272,621

[22] Filed: Nov. 17, 1988

[30] Foreign Application Priority Data

Dec. 31, 1987 [IL] Israel ......................................... 84998

[51] Int. Cl.[4] .......................... G01G 3/14; G01G 5/04; G01G 21/08
[52] U.S. Cl. ..................................... 177/211; 177/208; 177/256
[58] Field of Search ................. 177/208, 211, 256, 246

[56] References Cited

U.S. PATENT DOCUMENTS

| 3,658,143 | 4/1972 | Schwartz | 177/208 |
| 4,355,692 | 10/1982 | Ostrelich | 177/211 |
| 4,411,327 | 10/1983 | Lockery et al. | 177/211 |
| 4,429,756 | 2/1984 | Jacobson et al. | 177/211 |
| 4,433,741 | 2/1984 | Ryckman, Jr. | 177/211 X |
| 4,456,085 | 6/1984 | Boyles | 177/256 |
| 4,739,848 | 4/1988 | Tulloch | 177/211 |

Primary Examiner—George H. Miller, Jr.
Attorney, Agent, or Firm—Burgess, Ryan and Wayne

[57] ABSTRACT

A platform type weighing scale wherein an upper surface of a casing constitutes a weight bearing platform and wherein at least three foot elements extending out of a base surface of the casing and capable of limited displacement in directions into and out of said casing co-act with at least three counterbalanced, weight transmitting levers.

16 Claims, 6 Drawing Sheets

Fig. 4
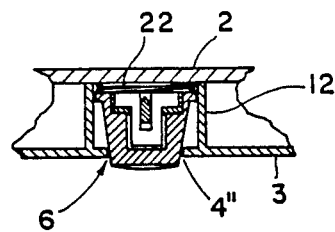
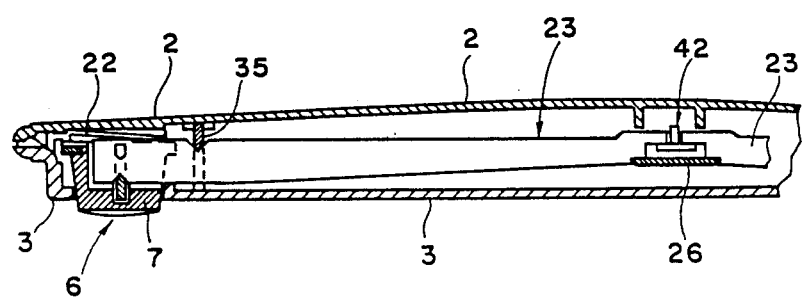
Fig. 3

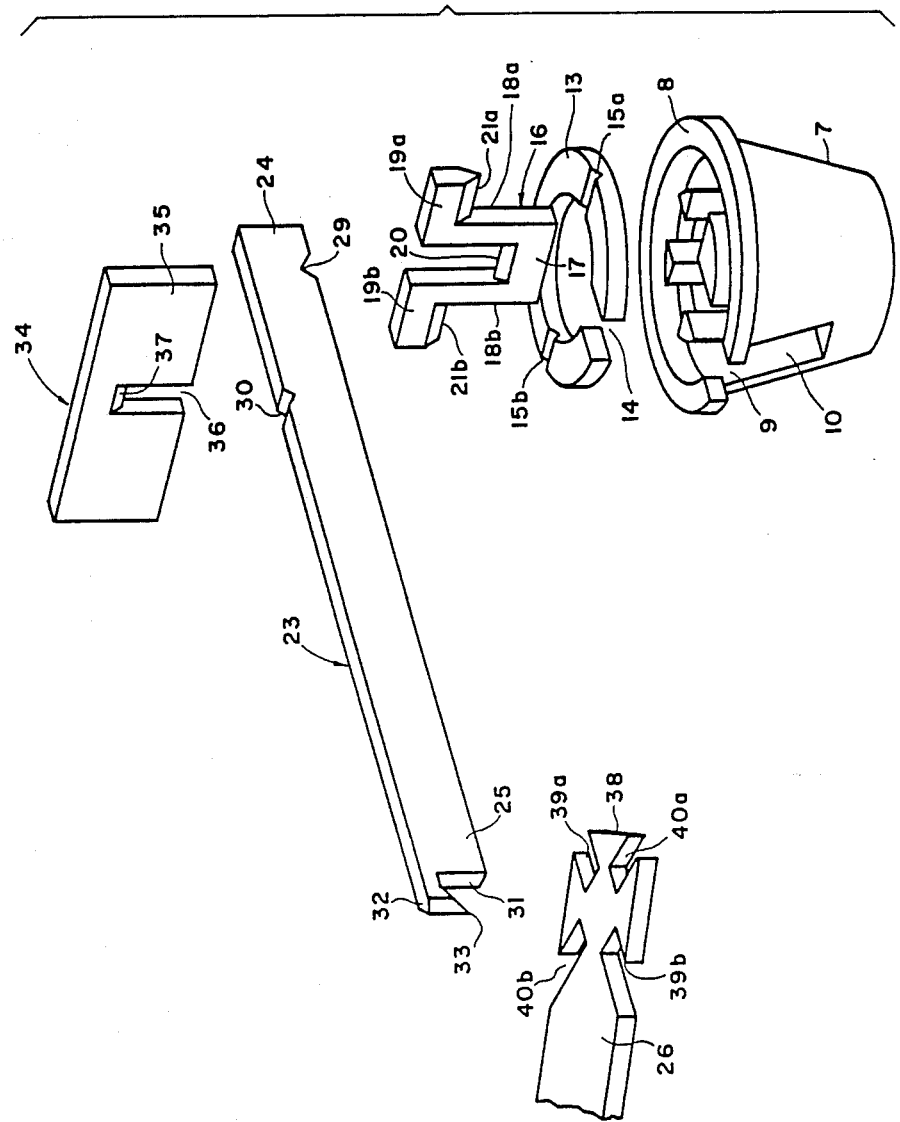

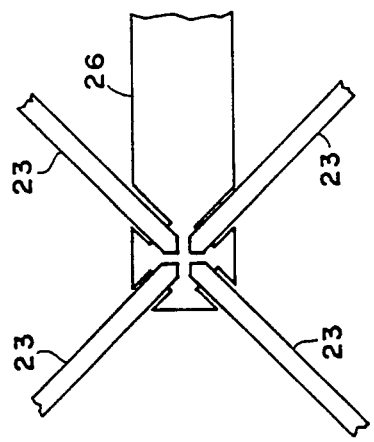
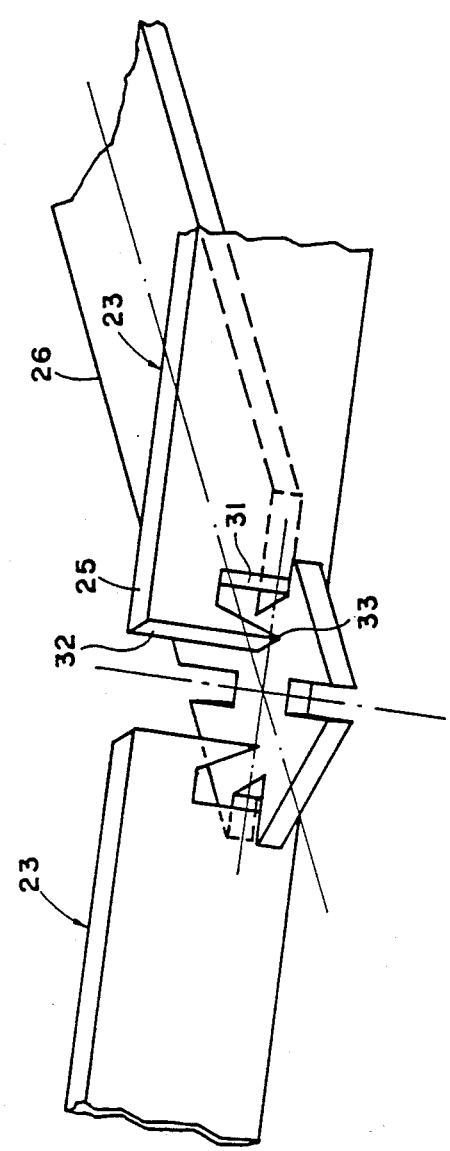

PLATFORM TYPE WEIGHING SCALE

FIELD OF THE INVENTION

This invention relates to a platform type weighing scale such as, for example, a so-called "bathroom scale" which is of substantially compact flat construction, includes a visual weight display, and is normally located on the floor so as to be readily accessible to be stepped on by the person who wishes to be weighed.

TECHNICAL BACKGROUND

Known platform weight scales of this kind are formed of a casting consisting of two relatively displaceable parts capable of limited articulated movement with respect to each other, one of the parts constituting the platform designed to receive the object or person to be weighed and the other part constituting the remaining portions of the casing. Displacement of the platform with respect to the remaining casing portions, under the influence of the weight of an object located on the platform, is transmitted to a weight sensing mechanism located within the casing and this in turn gives rise to a visible display of the weight. It will be readily appreciated that, for accurate weighing, the displacement of the platform, as transmitted to the weight sensing mechanism, should be as far as possible a predetermined, invariant function of the weight applied to the platform. For this purpose, it is important that the casing as a whole, and in particular the movable platform portion thereof, be formed of a rigid, non-distortable material and it is for this reason that such casings, or at least the movable platforms, have been formed of metal. Furthermore, the requirement to have a casing having two major, relatively displaceable components has inevitably reduced the possibilities of producing casings of reduced heights.

SUMMARY OF THE INVENTION

It is an object of the present invention to provide for a new and improved platform type weighing scale in which the above-referred-to disadvantages or limitations are substantially reduced.

According to the present invention, there is provided a platform type weighing scale comprising a casing, an upper surface of the casing constituting a weight bearing platform; a lower base surface of the casing; at least three foot elements extending out of said base surface at distributed peripheral locations thereof for supporting said casing and being capable of limited displacement in directions into and out of the casing; at least three counterbalanced, weight transmitting levers, distributed in the casing; outer ends of the levers articulatedly mounted on, and supported by, the foot elements; a weight sensing mechanism located in the casing; inner ends of the levers operatively engaging the weight sensing mechanism which is responsive to forces exerted thereon by said inner ends; and at least three fulcrum means mounted within the casing and bearing respectively against intermediate portions of the levers; the arrangement being such that displacement of a foot element into the casing results in a corresponding displacement of the outer lever end supported by that foot element and gives rise to an oppositely directed force being exerted by the inner end of that lever on the weight sensing mechanism.

Preferably the foot elements and the weight transmitting levers are substantially equiangularly distributed.

Thus, such a platform type weighing scale in accordance with the invention consists essentially of a unitary casing, the platform portion of which being made integrally with the remaining portion thereof. The only externally movable portions of the scale are the downwardly directed foot elements which can rest on the floor surface so as to move into and out of the casing in accordance with the forces exerted on the upper platform surface of the casing by the weight of the object placed thereon. Such a unitary casing no longer has to meet the high requirements of nondistortability which was the case when the upper surface thereof was displaceable with respect to the rest of the casing in conformity with the weight placed thereon.

A direct consequence of having such a unitary casing in accordance with the invention is that it is possible to form the casing of suitable plastics material, thereby rendering it possible to produce platform type weight scales of attractive construction, of minimal height and weight and with economy of production costs.

BRIEF DESCRIPTION OF THE DRAWINGS

For a better understanding of the present invention, and to show how the same can be carried out in practice, reference will now be made to the accompanying drawings, in which:

FIG. 3 is a cross-sectional view along the line III—III of the scale shown in FIG. 2;

FIG. 4 is a cross-sectional view along the line IV—IV of the scale shown in FIG. 2;

FIG. 5 is an exploded view of a detail of the scale shown in FIG. 2;

FIG. 6 is a perspective assembled view on an enlarged scale of a detail of the scale shown in FIG. 2;

FIG. 7 is a plan view from above on an enlarged scale of a detail of the scale shown in FIG. 2;

DETAILED DESCRIPTION OF ONE SPECIFIC EMBODIMENT IN ACCORDANCE WITH THE INVENTION

Figure 1:
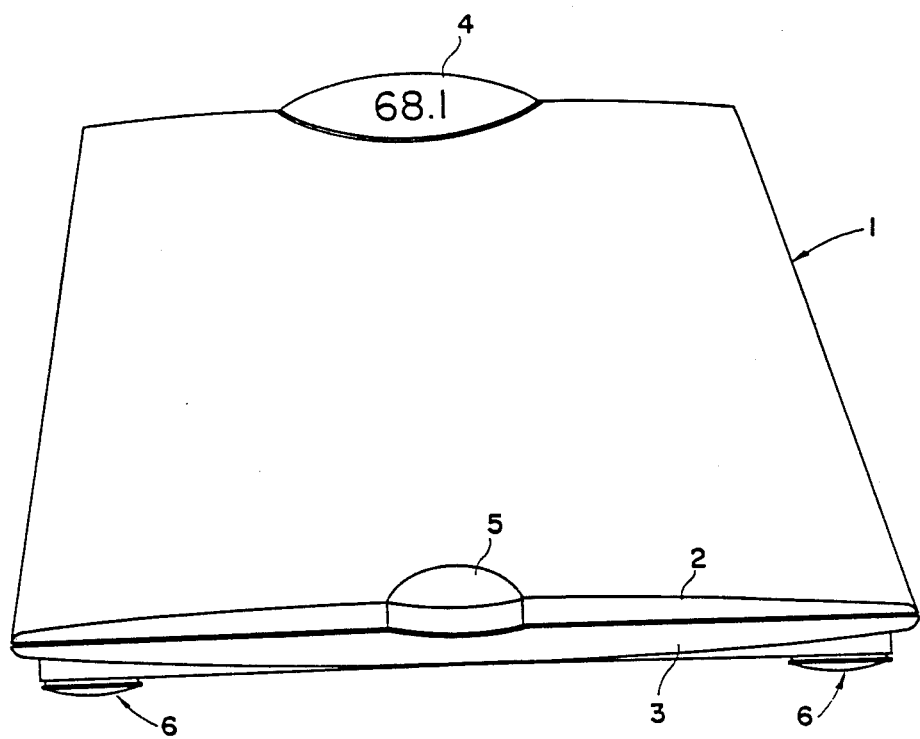
FIG. 1 is a perspective view from above of a platform type weighing scale in accordance with the present invention.

As seen in the drawings, the weighing scale comprises a flat housing 1 formed of a plastics material (such as that known under the trade designation ABS) and comprising upper and lower housing portions 2 and 3 which, after assembly of the scale, are suitably bonded together. The scale is furthermore provided with a digital display 4 and a power actuating switch 5. The case is furthermore provided with four foot elements 6 which are respectively located and extend from and through the four corners of the lower casing portion. As can be seen from FIGS. 4 and 5 of the drawings, each foot element 6 comprises a cup-shaped element 7 which tapers downwardly having an upper outwardly extending flange 8 and which is formed by molding so as to have an inner peripheral shoulder 9, an axial slot 10 being formed in the element 7, the flange 8 and the shoulder 9. Each element 7 is axially slidable into and out of the casing through an aperture 4 formed in the lower casing portion and of such dimensions as to allow for the sliding therethrough of the tapering element 7, displacement of the element 7 out of the casing being prevented by the abutment of the flange 8 against the rim of the aperture 4. The sliding displacement of the element 7 into and out of the casing 1 is guided by sidewalls 12 formed integrally with the lower casing portion in respect of which the flange 8 is located adjacent.

A metal bearing ring 13 is located within the element 7 resting on the peripheral shoulder 9 thereof and being formed with a slot 14 aligned with the axial slot 10. Formed in the bearing ring 13 at diametrically opposed locations thereof respectively displaced from the ring slot 14 by 90p on either side thereof is a pair of pivot grooves 15a and 15b of substantially V-shaped cross section.

Extending into the element 7 is an intermediate pivotal element 16 which is of inverted omega shape having a base web portion 17 and, extending upwardly therefrom, a pair of limbs 18a and 18b respectively provided with outwardly directed flanges 19a and 19b. Formed on the upper edge of the web portion 17 is a first knife edge pivot 20 whilst extending downwardly from the flanges 19a and 19b are second knife edge pivots 21a and 21b. When the intermediate pivotal element 16 rests on the bearing ring 13 with the second knife edge pivots 21a and 21b respectively located in the pivotal grooves 15a and 15b, the intermediate pivotal element 16 can swing about a pivotal axis defined by the pivotal grooves 15a and 15b.

A conical biasing spring 22 located between the upper surface of the flange 8 of the cup-shaped element 7 and the inner surface of the upper housing portion, serves to bias the cup-shaped element and hence the foot element 6 in a direction out of the housing 1.

Figure 2:
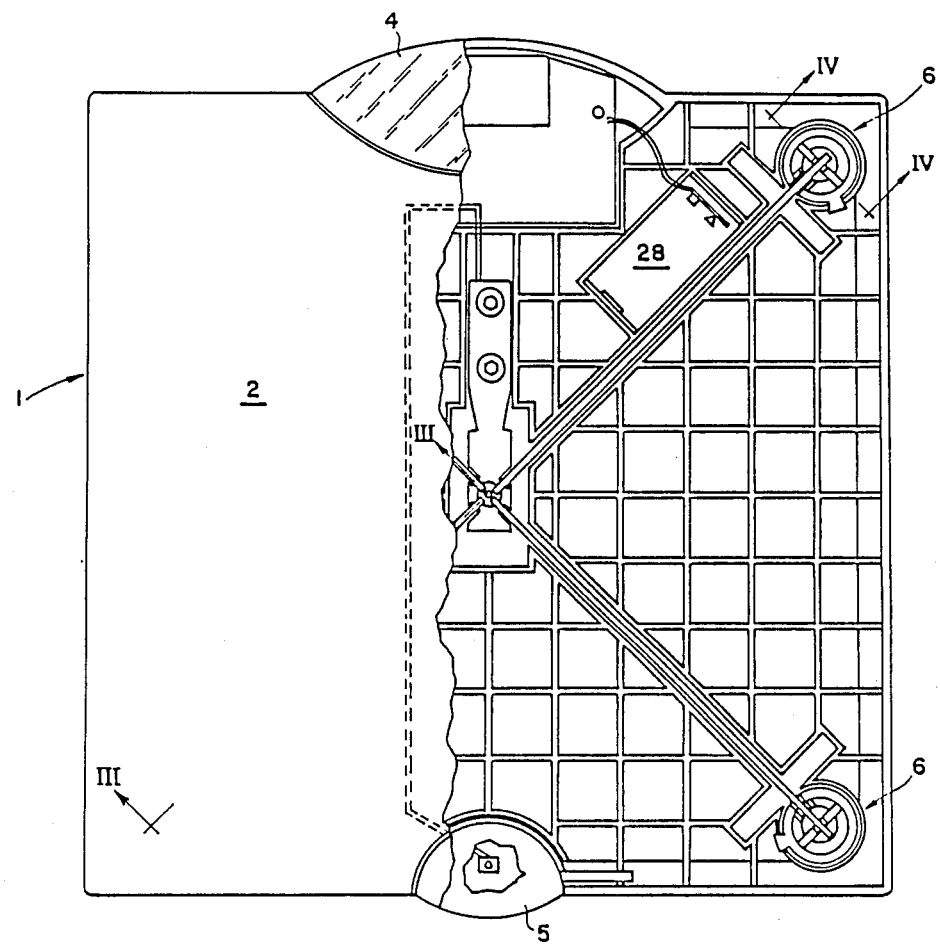
FIG. 2 is a plan view from above of the weighing scale shown in FIG. 1, with part of the upper wall cut away.

As can be seen in FIG. 2 of the drawings, there are located within the housing four weight transmitting levers 23 which extend respectively radially from the corners of the housing to a central location thereof. An outer end 24 of each lever 23 is pivotally mounted on an associated foot element 6 whilst an innermost end 25 of each lever 23 bears on a central bar element 26 which is fixedly mounted within the casing 1 and which carries a strain gauge (not shown), the latter being connected via an electronic circuit (not shown) powered by a battery 28, the circuit in turn being connected to the visual display 4, the switch 5 being designed to actuate or deactuate the circuit.

A V-shaped pivot groove 29 is formed on the under edge of each lever 23 adjacent the outer end 24 thereof, whilst a further V-shaped pivot groove 30 is formed on an upper edge of each lever 23 at an intermediate portion thereof. The inner end 24 of each lever is formed with a recessed edge 31 and a projecting nose 32 which, in the embodiment shown in FIG. 5 of the drawings, has a downwardly extending point 33.

Secured to the inner surface of the upper housing portion and depending downwardly therefrom are fixed fulcrum means 34, each such means comprising a bar 35 having formed therein a slot 36, the upper end of the slot being bounded by a knife shaped pivot 37 which extends downwardly into the slot.

The outer end 24 of each lever 23 extends into its associated cup-shaped element 7 via the slot 10 formed therein and rests on the intermediate pivotal element 16, the first knife pivot 20 thereof being located with the V-shaped groove 29 formed in the outer end 24 of the lever 23. At the same time, the intermediate portion of the lever 23 is located within the slot 36 of the fulcrum bar 35 with the knife edged pivot 37 thereof located within the V-shaped groove 30 formed in the intermediate portion of the lever 23.

A free end portion 38 of the central bar element 26 is formed with two pairs of aligned slots 39a, 39b, 40a, 40b, the constituent slots of each pair being aligned whilst one pair of aligned slots is disposed at right angles to the other pair of aligned slots.

The recessed edges 31 of each lever is located within a separate one of the slots 39, 40 and in this way is correctly aligned with respect to the central bar element. The downwardly extending points 33 of the levers 23 bear on a substantially central portion of the free end 38 of the central bar 26.

When thus assembled, each of the weight transmitting levers 23 is, in effect, counterbalanced about its fixed fulcrum means 34. If now, with the weight scale located on a floor surface, a weight is applied to the upper housing portion (constituting in effect a platform), the application of this weight results in the foot element 6 being displaced inwardly into the housing. This displacement results in an upwardly directed pivoting of the outer ends 24 of the levers 23 and a downwardly directed pivoting of the inner ends 25 of the levers 23. This downwardly directed pivoting acts on the central bar element 26 so as to tend to distort the latter, the distorting force acting on the central bar element 26 being converted by the strain gauge into an electric signal which ultimately causes a visual digital display to appear.

Thus, weighing results from the inwardly directed movement of the foot elements rather than from a downwardly directed movement of a displaceable platform. The weight scale, therefore, operates effectively irrespective of the nature of the floor surface on which it is located, i.e. whether that floor surface is a rigid stone surface or is a soft pile carpet.

In the arrangement just described, it will be readily appreciated that the downwardly directed points 33 of the respective levers cannot all act exactly on the same position of the free end 38 of the bar element 26. It is possible to compensate for the slight variations in the positions where these points act by suitably varying the position about which the lever pivots with respect to the fixed fulcrum means 34. For this purpose, it is possible to form the intermediate portion of the lever with a plurality of adjacently disposed V-shaped grooves 30, that groove being chosen which would give a suitable compensation for a variation of the point on the central bar element 26.

Figure 8:
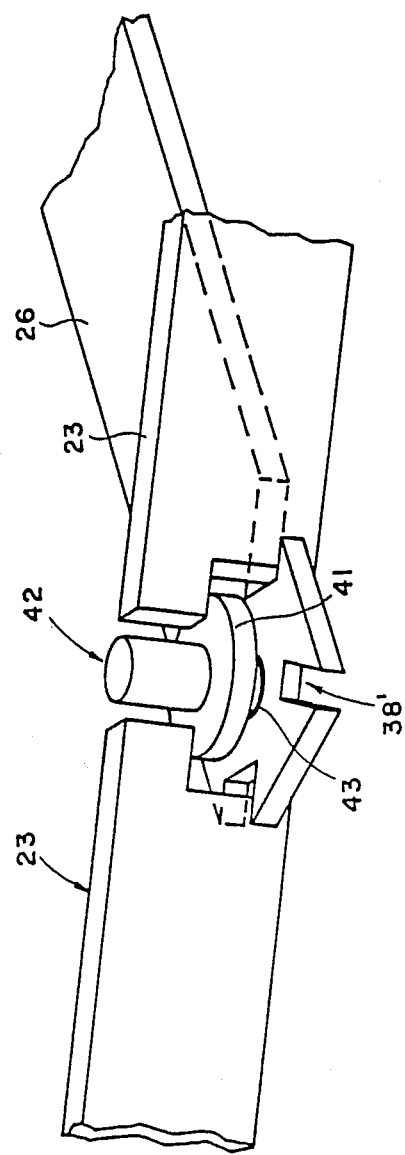
FIG. 8 is a perspective view on an enlarged scale of a modified form of the detail shown in FIG. 6.
Figure 9:
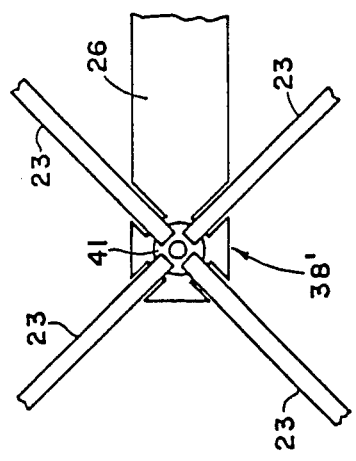
FIG. 9 is a plan view from above of the modified detail shown in FIG. 8.

As an alternative to the arrangement just described, wherein the innermost ends of the levers 23 bear directly on the free end 38 of the central bar element 26, FIGS. 8 and 9 show an alternative arrangement wherein modified projecting noses 38' (not provided with downwardly extending points) bear on an annular shoulder 41 of an intermediate bearing element 42 having a downwardly directed pivoting point 43. It will thus be clearly seen that, effectively, all the levers 23 bear on the identical location of the free end 38 of the bar element 26, this location being defined by the position on the bar element abutted by the pivoting point 43. With such an arrangement, the previously described provision for compensating for differences in the area of bearing of the inner ends of the levers 23 on the central bar element 26 is rendered unnecessary.

It will be appreciated that, by virtue of the fact that the outer ends of the levers 23 are pivotally supported on the intermediate pivotal element 16 which, in its turn, can pivotally swing, any tendency of distortion in the casing which can take place during assembly is readily absorbed by the slight freedom of movement of each lever along its longitudinal axis by virtue of the swinging of its associated intermediate pivotal element 16.

The arrangement just described allows for the production of the casing of suitable plastics material seeing that it is no longer necessary to ensure that the upper platform of the casing must be free of any distortion, a requirement which in the past made it necessary to make the casing of a rigid metal. Whilst the casing and the associated foot elements are formed of plastic material, the weight transmission levers and the pivotal supports (the bearing ring 13, the intermediate pivotal element 16 and the fixed fulcrum means 34) are suitably made of metal.

Furthermore, whilst the invention has been specifically described as being applied to a scale having four foot elements and four weight transmission levers, the invention is equally applicable where three equiangularly distributed foot elements and corresponding transmission levers are employed.

Furthermore, whilst the provision of the central bar element 26 with radially directed slots 39 and 40 have been described as used with a weight scale having displaceable foot elements, it will be readily appreciated that this feature is equally applicable to weight scales having the conventional displacement platform.

We claim:

1. A platform type weighing scale comprising a casing; an upper surface of said casing constituting a weight bearing platform; a lower base surface of said casing; at least three foot elements extending out of said base surface at distributed peripheral locations thereof for supporting said casing and being capable of limited displacement in directions into and out of said casing; at least three counterbalanced, weight transmitting levers, distributed in the casing; outer ends of said levers articulatedly mounted on, and supported by, said foot elements; a weight sensing mechanism located in said casing; inner ends of said levers operatively engaging the weight sensing mechanism which is responsive to forces exerted thereon by said inner ends; and at least three fulcrum means mounted within said casing and bearing respectively against intermediate portions of said levers; the arrangement being such that displacement of a foot element into the casing results in a corresponding displacement of the outer lever end supported by that foot element and gives rise to an oppositely directed force being exerted by the inner end of that lever on the weight sensing mechanism.

2. A weighing scale according to claim 1 wherein said foot elements and said weight transmitting levers are substantially equiangularly distributed.

3. A weighing scale according to claim 2 wherein four levers are provided, these being respectively associated with four foot elements and four fulcrum means.

4. A weighing scale according to claim 1 wherein each outer end of said levers is pivotally mounted about a knife-edge pivot with respect to its associated foot element.

5. A weighing scale according to claim 4 wherein each outer end of said levers is pivotally mounted on an intermediate pivotal element, and the intermediate pivotal element is pivotally mounted with respect to said foot element so as to allow for limited displacement of the lever in the direction of its longitudinal axis.

6. A weighing scale according to claim 5 wherein said intermediate pivotal element is formed with first and second oppositely directed knife edge pivots, each outer end resting on a first knife edge pivot whilst said intermediate pivotal element being supported on said foot element via said second knife edge pivot.

7. A weighing scale according to claim 6 wherein said intermediate pivotal element is of omega shape, said first knife edge pivot being formed on an inner edge of a web portion of the element whilst said second knife edge pivot is formed on edges of a pair of outwardly directed flanges of the element.

8. A weighing scale according to claim 7 wherein each said foot element is of cup-like construction tapering from an open end located within the casing towards a closed end located outside the casing, said intermediate pivotal element being located within the foot element with the associated lever extending through a slotted wall portion of the foot element.

9. A weighing scale according to claim 8 wherein said intermediate pivotal element is pivotally supported on said foot element via an annular element fitted within or formed integrally with an inner portion of the foot element adjacent to the open end thereof, said annular element being formed with a pair of diametrically opposed grooves into which said second knife edge pivots fit.

10. A weighing scale according to claim 1 wherein each fulcrum means is formed with a knife edge pivot which fits into a groove formed in an intermediate portion of the lever.

11. A weighing scale according to claim 10 wherein a plurality of closely spaced grooves are formed in the intermediate portion of the lever.

12. A weighing scale according to claim 1 wherein said weight sensing mechanism includes a bar element located within the casing and on which the inner ends of said levers bear, at least indirectly, so that said force is exerted on said bar element.

13. A weighing scale according to claim 12 wherein said bar element is formed at its edges with slots into which fit the inner ends of said levers.

14. A weighing scale according to claim 13 wherein each inner lever end is formed with a recessed edge which fits into one of said slots and a projecting nose which bears at least indirectly on said bar element.

15. A weighing scale according to claim 14 wherein said projecting nose is formed with a depending point which bears on said bar element.

16. A weighing scale according to claim 14 wherein there is furthermore provided an intermediate bearing element comprising a bearing platform upon which said projecting noses bear and a central pivot point depending from said bearing platform and bearing on said beam element.

* * * * *